(12) United States Patent
Liu et al.

(10) Patent No.: US 11,327,990 B2
(45) Date of Patent: May 10, 2022

(54) METHOD AND DEVICE FOR PROCESSING USER PORTRAIT AND SERVER

(71) Applicant: BEIJING BAIDU NETCOM SCIENCE AND TECHNOLOGY CO., LTD., Beijing (CN)

(72) Inventors: Haocheng Liu, Beijing (CN); Hanchenxi Xu, Beijing (CN); Yanhe Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 254 days.

(21) Appl. No.: 16/790,076

(22) Filed: Feb. 13, 2020

(65) Prior Publication Data
US 2020/0334266 A1 Oct. 22, 2020

(30) Foreign Application Priority Data
Apr. 16, 2019 (CN) .......................... 201910304863.0

(51) Int. Cl.
*G06F 16/00* (2019.01)
*G06F 16/25* (2019.01)
(Continued)

(52) U.S. Cl.
CPC ........ *G06F 16/254* (2019.01); *G06F 16/2379* (2019.01); *G06Q 30/0269* (2013.01)

(58) Field of Classification Search
CPC .... G06F 16/51; G06F 3/0482; G06F 3/04842; G06F 3/04845; G06F 3/1205;
(Continued)

(56) References Cited

U.S. PATENT DOCUMENTS

| 2007/0179973 A1* | 8/2007 | Brodie | ...................... G06F 9/50 |
| 2011/0012929 A1* | 1/2011 | Grosz | .................. G06F 40/103 |
| | | | 345/661 |

(Continued)

FOREIGN PATENT DOCUMENTS

| CN | 109189899 A | 1/2019 |
| CN | 109522467 A | 3/2019 |

(Continued)

OTHER PUBLICATIONS

Office Action for Japanese Application No. 2020-073246, dated Mar. 30, 2021, 4 pages.

(Continued)

*Primary Examiner* — Yicun Wu
(74) *Attorney, Agent, or Firm* — Fay Sharpe LLC

(57) ABSTRACT

The present disclosure relates to a technical field of user portraits, and provides a user portrait processing method, a user portrait processing device, a server and a storage medium, for a purpose of solving a problem that it is difficult to trace historical label features of a user since an original label feature is replaced by an updated label feature when the user portrait is updated in the related art. The method includes: when receiving a message for updating user portrait data of a user account, obtaining the updated user portrait data. The user portrait data includes a label feature. The method further includes storing the updated user portrait data in association with an update time as user portrait information of the user account. The present disclosure is applicable for performing statistics on historical information of the user portrait.

6 Claims, 2 Drawing Sheets

(51) Int. Cl.
*G06F 16/23* (2019.01)
*G06Q 30/02* (2012.01)

(58) Field of Classification Search
CPC ...... G06F 3/1242; G06F 3/126; G06F 3/0484;
G06F 3/048; G06F 3/0483; G06F 3/1204;
G06F 3/1272; G06F 3/1287; G06F
40/174; G06F 40/186; G06F 15/00; G06F
15/16; G06F 3/12; G06F 3/14; G06F
40/103; G06F 16/58; G06F 21/36; G06F
3/0481; G06F 3/0485; G06F 3/167; G06F
16/9535; G06F 16/9537; G06F 16/2272;
G06F 16/2365; G06F 3/04883; G06F
3/1288; G06F 21/316; G06F 3/1211;
G06F 40/12; G06Q 10/101; G06Q
30/0601; G06Q 30/0621; G06Q 10/00;
G06Q 30/00; G06Q 30/0643; G06Q
30/0279; G06Q 40/12; G06Q 20/405;
G06Q 10/10; G06Q 20/027; G06Q
20/065; G06Q 30/0631; G06Q 50/01;
G06Q 10/06; G06Q 10/063; G06Q
10/087; G06Q 20/0658; G06Q 20/10;
G06Q 20/227; G06Q 20/321; G06Q
20/381; G06Q 20/3823; G06Q 20/384;
G06Q 20/386; G06Q 20/389; G06Q
20/4016; G06Q 2220/00; G06Q 30/0241;
G06Q 30/04; G06Q 30/06; G06Q 50/06
See application file for complete search history.

(56) References Cited

U.S. PATENT DOCUMENTS

| | | | |
|---|---|---|---|
| 2013/0013699 A1* | 1/2013 | Huxley | G06Q 10/101 709/206 |
| 2016/0012078 A1* | 1/2016 | Kutner | G06F 16/48 707/722 |
| 2016/0132934 A1* | 5/2016 | Hartlaub | G06Q 30/0269 705/14.64 |
| 2018/0211723 A1 | 7/2018 | Coles et al. | |

FOREIGN PATENT DOCUMENTS

| | | |
|---|---|---|
| JP | 2001036567 A | 2/2001 |
| KR | 20120053551 A | 5/2012 |
| WO | 2019026196 A2 | 2/2019 |

OTHER PUBLICATIONS

Office Action for Chinese Application No. 201910304863.0, dated Nov. 2, 2020, 26 pages.
Office Action for Korean Application No. 10-2020-0045498, dated Dec. 22, 2021, 6 pages.

* cited by examiner

METHOD AND DEVICE FOR PROCESSING USER PORTRAIT AND SERVER

CROSS REFERENCE TO RELATED APPLICATIONS

This application claims priority and benefits to Chinese Application No. 201910304863.0, filed on Apr. 16, 2019, the entire content of which is incorporated herein by reference.

TECHNICAL FIELD

The present disclosure relates to the field of user portraits, and more particularly, to a user portrait processing method, a user portrait processing device, a server and a storage medium.

BACKGROUND

When user portrait information is updated, an original label feature is covered by a new label feature, which makes it difficult to trace historical label features of the user. For example, the user portrait information includes that the user got a job at 2014 with a monthly salary of 6,000 yuan, while the monthly salary of this job reached 15,000 yuan at 2018, and thus a salary feature of the user portrait is updated to 15,000 yuan. Data samples from the user portrait at 2014 may be used in modeling a venture capital model. Inaccuracy of the model may be caused when the salary feature at 2018 as feature samples for modeling the model.

SUMMARY

The present disclosure provides a method for processing a user portrait. The method includes: when receiving a message for updating user portrait data of a user account, obtaining updated user portrait data and storing the updated user portrait data in association with an update time as user portrait information of the user account. The user portrait data includes a label feature.

The present disclosure provides a server. The server is configured to implement the method for processing a user portrait described above.

The present disclosure provide a storage medium, having instructions stored thereon. When the instructions are executed by a computer, the computer is caused to implement the method for processing a user portrait described above.

Additional aspects and advantages of embodiments of the present disclosure will be described in detail in the embodiments of the present disclosure.

BRIEF DESCRIPTION OF THE DRAWINGS

The accompanying drawings are used to further understand the present disclosure, and constitute a portion of the description. The specific embodiments described herein are only used to explain the present disclosure rather than to limit the present disclosure, in which.

DETAILED DESCRIPTION

Figure 1:
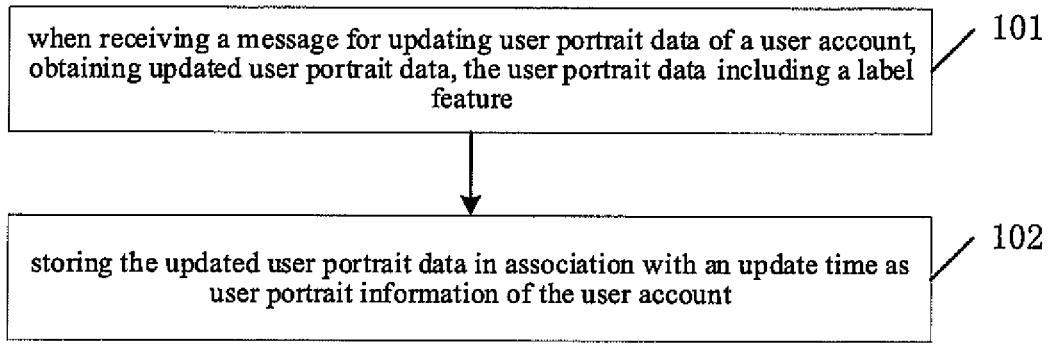
FIG. 1 is a flowchart illustrating a method for processing a user portrait according to embodiments of the present disclosure.

Embodiments of the present disclosure will be described in detail and examples of embodiments are illustrated in the drawings. It should be noted that embodiments described herein with reference to drawings are explanatory, serve to explain the present disclosure, and are not construed to limit embodiments of the present disclosure.

When user portrait information is updated, an original label feature is covered by a new label feature, which makes it difficult to trace historical label features of the user.

Therefore, the present disclosure provides a user portrait processing method, a user portrait processing device, a server and a storage medium, for a purpose of solving a problem that it is difficult to trace historical label features of the user since an original label feature is replaced by an updated label feature when the user portrait is updated in the related art. Storing the updated user portrait data in association with an update time provides a basis for subsequent query of label features in the user portrait data.

As described below, when receiving the message for updating user portrait data of the user account, the updated user portrait data is obtained and the updated user portrait data is stored in association with the update time as the user portrait information of the user account. The user portrait data includes the label feature. Therefore, the present disclosure solves a problem that it is difficult to trace historical label features of the user since the original label feature is replaced by the updated label feature when the user portrait is updated in the related art, thereby facilitating subsequent query of label features in the user portrait data.

FIG. 1 is a flowchart illustrating a method for processing a user portrait according to embodiments of the present disclosure. As illustrated in FIG. 1, the method may include the following.

At block 101, when a message for updating user portrait data of a user account is received, updated user portrait data is obtained. The user portrait data includes a label feature.

At block 102, the updated user portrait data is stored in association with an update time as user portrait information of the user account.

The user portrait information store may also include an account identification that may uniquely identify the user account and a version number of the user portrait information. For example, the user portrait information may include "1000010_1", where "1000010" indicates the account identification of the user account and "1" indicates the version number of the user portrait information of this user account. In addition, the user portrait information may be stored in "json" format as follows:

1000010_1 {"base": {"age": 24, "gender": 2, "edu": 2}} 2018-03-01 where, "1000010_1" includes the account identification (i.e., "1000010") of the user account and the version number (i.e., "1") of the user portrait information, the middle portion {"age": 24, "gender": 2, "edu": 2} is the label feature, and the followed time "2018-03-01" indicates the update time of the user portrait data.

With the above descriptions, when the user portrait data of the user account is updated, such as when the label feature is updated, the update time may be stored in association with the user portrait data. Therefore, a problem that it is difficult to trace the original label feature since the original label feature is covered by the updated label feature may be solved.

In an example, statistical analysis may be performed on label features based on the stored user portrait information. For example, when a label feature extraction instruction is received, a target time corresponding to the label feature to be extracted is obtained from the label feature extraction instruction. The update time corresponding to the target time may be searched for in the stored user portrait information. The label feature corresponding to the update time that corresponds to the target time is extracted from the user portrait information. For example, the target time carried in the label feature extraction instruction may be a range from March of 2019 to April of 2019. The target time from March of 2019 to April of 2019 may be extracted from the label feature extraction instruction. The update time corresponding to the target time may be searched for in the stored user portrait information of the user account. That is, all update times within the range from March of 2019 to April of 2019 may be searched for: The label features within this time period may be extracted from the user portrait information. For example, in the marketing operations performed every first month of each quarter, target users (such as high-quality users) may be found based on the label features of the user profile information. The target users may be found based on the label features within the past 6 months. For example, the target users of the short-message marketing customer group mining model in April of 2019 may be found relying on the label features of the user portrait information within a time range from October of 2018 to March of 2019. After the above-mentioned label features are extracted, analysis and statistics can be performed on the label features.

In another example, an existence count of each label feature within a preset time period may be determined for the label features of the user portrait information stored. The label feature having a maximum existence count may be determined as an interested label feature of the user account within the preset time period. For example, the existence count of each label feature of the user account from January of 2018 to June of 2018 may be determined. The label feature having the maximum existence count (that is, the label feature that is most frequently occurred) from January of 2018 to June of 2018 may be determined as the interested label feature of the user account. In still another example, the existence counts of the label features may be ranked from high to low. The top preset number of label features may be determined as the interested label features of the user account from January of 2018 to June of 2018. According to the interested label feature of the user account within the preset time period, an advertisement related to the interested label feature may be pushed to the user account within the preset time period periodically (that is, the advertisement may be pushed within the same time period as the preset time period). For example, in a case where the interested label features of the user account from January of 2018 to June of 2018 is travelling, advertisements related to travelling may be pushed to the user account from January of 2019 to June of 2019. For example, in a case where the interested label feature of the user account from July of 2018 to December of 2018 is shopping, e-commerce advertisements such as shopping spike and special offers, may be pushed to the user account from July of 2019 to December of 2019.

With embodiments of the present disclosure, the updated user portrait data is stored in association with the update time, to provide a basis for subsequent query of the label features in the user portrait data and to provide data support for subsequent data statistics of historical label features.

Figure 2:
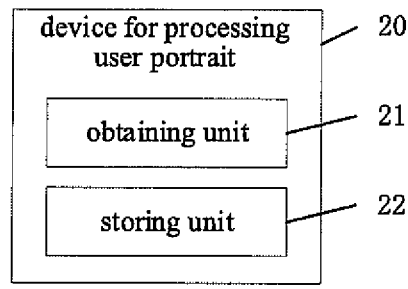
FIG. 2 is a block diagram illustrating a device for processing a user portrait according to embodiments of the present disclosure.

FIG. 2 is a block diagram illustrating a device for processing a user portrait according to embodiments of the present disclosure. As illustrated in FIG. 2, the device 20 may include an obtaining unit 21 and a storing unit 22. The obtaining unit 21 is configured to obtain updated user portrait data when a message for updating user portrait data of a user account is received. The user portrait data includes label features. The storing unit 22 is configured to store the updated user portrait data in association with an update time as user portrait information of the user account.

With embodiments of the present disclosure, a problem that it is difficult to trace historical label features of the user since the original label feature is replaced by the updated label feature when the user portrait is updated in the related art, thereby facilitating subsequent query of label features in the user portrait data.

Figure 3:
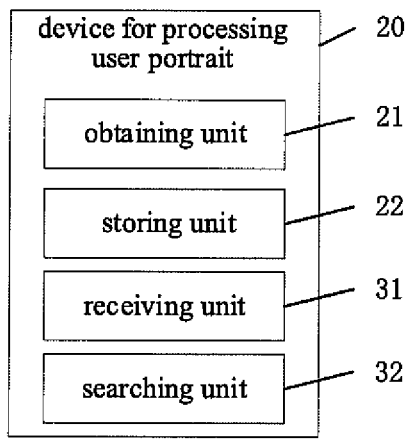
FIG. 3 is a block diagram illustrating a device for processing a user portrait according to embodiments of the present disclosure.
Figure 4:
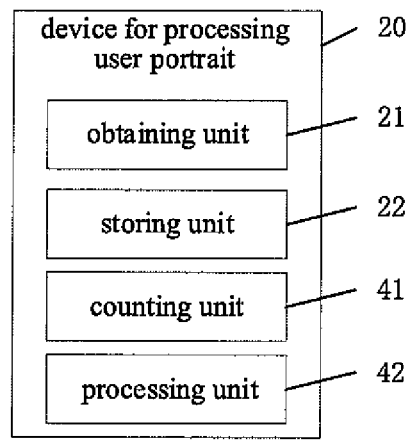
FIG. 4 is a block diagram illustrating a device for processing a user portrait according to embodiments of the present disclosure.

As illustrated in FIG. 3, the device 20 may further include a receiving unit 31 and a searching unit 32. The receiving unit 31 is configured to receive a label feature extraction instruction. The obtaining unit is configured to obtain a target time corresponding to the label feature to be extracted from the label feature extraction instruction in response to receiving the label feature extraction instruction. The searching unit 32 is configured to search for. the update time corresponding to the target time from the user portrait information stored. The obtaining unit is further configured to extract the label feature corresponding to the update time that corresponds to the target time from the user portrait information.

The device 20 may further include a counting unit 41 and a processing unit 42. The counting unit 41 is configured to determine an existence count of each label feature within a preset time period for the label features in the user portrait information stored. The processing unit 42 is configured to determine the label feature having a maximum existence count as an interested label feature of the user account within the preset time period.

Figure 5:
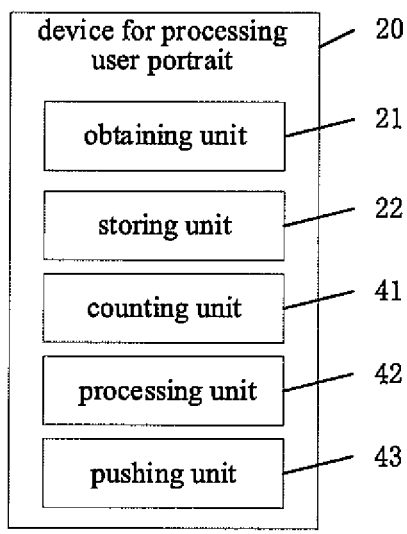
FIG. 5 is a block diagram illustrating a device for processing a user portrait according to embodiments of the present disclosure.

As illustrated in FIG. 5, the device 20 may further include a pushing unit 43. The pushing unit 43 is configured to, based on the interested label feature of the user account within the preset time period, push an advertisement related to the interested label feature to the user account within the preset time period periodically.

For the implementation process of the foregoing device, reference may be made to the implementation process of the foregoing user portrait processing method.

Embodiments of the present disclosure further provide a server. The server is configured to implement the method for processing a user portrait described above.

Embodiments of the present disclosure further provide a storage medium, having instructions stored thereon. When the instructions are executed by a computer, the computer is caused to implement the method for processing a user portrait described above.

Those skilled in the art should understand that the embodiments of the present disclosure may be provided as a method, a system, or a computer program product. Therefore, this application may take the form of an entirely hardware embodiment, an entirely software embodiment, or an embodiment combining software and hardware. Moreover, this application may take the form of a computer program product implemented on one or more computer-usable storage media (including but not limited to disk memories, CD-ROMs, and optical memories) containing computer-usable program codes.

This application is described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are used to generate means for implementing the functions specified in one or more flowcharts and/or one or more blocks of the block diagrams.

These computer program instructions may also be stored in a computer-readable memory capable of directing a computer or other programmable data processing device to operate in a specific manner such that the instructions stored in the computer-readable memory produce a manufactured article including an instruction device, the instructions device implements the functions specified in one or more flowcharts and/or one or more blocks of the block diagram.

These computer program instructions can also be loaded onto a computer or other programmable data processing device, so that a series of operating steps can be performed on the computer or other programmable device to produce a computer-implemented process, which can be executed on the computer or other programmable device. The instructions executed on the computer or other programmable device provide steps for implementing the functions specified in one or more flowcharts and/or one or more blocks of the block diagrams.

In a typical configuration, a computing device includes one or more processors (CPUs), input/output interfaces, network interfaces, and memories.

The memory may include non-permanent memory, random access memory (RAM), and/or non-volatile memory in the computer-readable media, such as read-only memory (ROM) or flash memory (flash RAM). Memory is an example of a computer-readable medium.

Computer-readable media includes permanent and non-persistent, removable and non-removable media. Information storage can be accomplished by any method or technology. Information may be computer-readable instructions, data structures, modules of a program, or other data. Examples of computer storage media include, but are not limited to, a phase change random access memory (PRAM), a static random access memory (SRAM), a dynamic random access memory (DRAM), other types of random access memory (RAM), and read-only memory (ROM), electrically erasable programmable read-only memory (EEPROM), flash memory or other memory technologies, read-only disc read-only memory (CD-ROM), digital versatile disc (DVD) or other optical storage, magnetic tape cartridges, magnetic tape storage or other magnetic storage devices or any other non-transmitting medium may be used to store information that can be accessed by a computing device. As defined herein, computer-readable media does not include temporary computer-readable media (transitory media), such as modulated data signals and carrier waves.

It should also be noted that the terms "including", "comprising" or any other variants thereof are intended to cover non-exclusive inclusion, so that a process, method, product or device that includes a series of elements includes not only those elements but also other elements not explicitly listed, or those that are inherent to such a process, method, product, or device. Without limitation, the elements defined by the sentence "comprising a . . . " do not exclude that there are other identical elements in the process, method, product or equipment including the elements.

Those skilled in the art should understand that the embodiments of the present disclosure may be provided as a method, a system, or a computer program product. Therefore, this application may take the form of an entirely hardware embodiment, an entirely software embodiment, or an embodiment combining software and hardware. Moreover, this application may take the form of a computer program product implemented on one or more computer-usable storage media (including but not limited to a disk storage, a CD-ROM, and an optical storage) containing computer-usable program code.

The above are only examples of the present disclosure and are not intended to limit the present application. For those skilled in the art, this application may have various modifications and changes. Any modification, equivalent replacement, and improvement made within the spirit and principle of this application shall be included in the scope of claims of this application.

What is claimed is:

1. A method for processing a user portrait, comprising:
in response to receiving a message for updating user portrait data of a user account, obtaining updated user portrait data, wherein the user portrait data comprises a label feature; and
storing the updated user portrait data in association with an update time as user portrait information of the user account;
wherein the method further comprises:
in response to the user portrait data at least comprising a first label feature and a second label feature, determining a first occurrence frequency of the first label feature within a preset time period and determining a second occurrence frequency of the second label feature within the preset time period; and
pushing an advertisement related to the first label feature to the user account within the preset time period in response to the first occurrence frequency being greater than the second occurrence frequency, or pushing an advertisement related to the second label feature to the user account within the preset time period in response to the second occurrence frequency being greater than the first occurrence frequency.

2. The method of claim 1, further comprising:
in response to receiving a label feature extraction instruction, obtaining a target time corresponding to the label feature to be extracted from the label feature extraction instruction;
searching for the update time corresponding to the target time from the user portrait information stored; and
extracting the label feature in the user portrait information based on the update time.

3. A server, comprising:
a processor; and
a memory, configured to store instructions executable by the processor, wherein the processor is configured to:
in response to receiving a message for updating user portrait data of a user account, obtain updated user portrait data, wherein the user portrait data comprises a label feature; and
store the updated user portrait data in association with an update time as user portrait information of the user account;
wherein the processor is further configured to:
in response to the user portrait data at least comprising a first label feature and a second label feature, determine a first occurrence frequency of the first label feature within a preset time period and determine a second occurrence frequency of the second label feature within the preset time period; and
push an advertisement related to the first label feature to the user account within the preset time period in response to the first occurrence frequency being greater than the second occurrence frequency, or push an advertisement related to the second label feature to the user account within the preset time period in response to the second occurrence frequency being greater than the first occurrence frequency.

4. The server of claim 3, wherein the processor is further configured to:
in response to receiving a label feature extraction instruction, obtain a target time corresponding to the label feature to be extracted from the label feature extraction instruction;
search for the update time corresponding to the target time from the user portrait information stored; and
extract the label feature in the user portrait information based on the update time.

5. A non-transitory computer readable storage medium, having instructions stored thereon, wherein when the instructions are executed by a computer, the computer is caused to implement a method for processing a user portrait, the method comprising:
in response to receiving a message for updating user portrait data of a user account, obtaining updated user portrait data, wherein the user portrait data comprises a label feature; and
storing the updated user portrait data in association with an update time as user portrait information of the user account;
wherein the method further comprises:
in response to the user portrait data at least comprising a first label feature and a second label feature, determining a first occurrence frequency of the first label feature within a preset time period and determining a second occurrence frequency of the second label feature within the preset time period; and
pushing an advertisement related to the first label feature to the user account within the preset time period in response to the first occurrence frequency being greater than the second occurrence frequency, or pushing an advertisement related to the second label feature to the user account within the preset time period in response to the second occurrence frequency being greater than the first occurrence frequency.

6. The non-transitory computer readable storage medium of claim 5, wherein the method further comprises:
in response to receiving a label feature extraction instruction, obtaining a target time corresponding to the label feature to be extracted from the label feature extraction instruction;
searching for the update time corresponding to the target time from the user portrait information stored; and
extracting the label feature in the user portrait information based on the update time.

* * * * *